Patented Dec. 18, 1945

2,391,014

UNITED STATES PATENT OFFICE 2,391,014

ALKALOIDAL "FREE" FRACTION FROM SPECIES OF ERYTHRINA AND PROCESSES FOR ITS PRODUCTION

Karl Folkers, Plainfield, N. J., assignor to Merck & Co., Inc., Rahway, N. J., a corporation of New Jersey No Drawing. Application October 12, 1940, Serial No. 360,922

6 Claims. (Cl. 260—236)

This invention relates to an alkaloid fraction having important physiological activity and to processes for its production from species of Erythrina.

The alkaloids which applicant has produced for the first time from species of Erythrina cause, physiologically, a potent curare-like action and certain of them have been found particularly useful for the release of spasm and plastic muscular rigidity in patients with spastic paralysis and for the modification of the severity of the metrazol convulsions, thereby preventing fractures in the convulsive therapy of the psychoses.

Generally, plant alkaloids occur in the form of salts of acids such as malic, oxalic, succinic, tannic, or other vegetable acids. In some instances, plant alkaloids occur as salts of special acids, for example, aconitine occurs chiefly in combination with aconitic acid; the opium alkaloids occur largely with meconic acid; the cinchona alkaloids occur with quinic acid, etc. The occurrence of plant alkaloid salts of inorganic acids is not infrequent, thus morphine occurs naturally in opium in part as morphine sulfate (see Allen's Commercial Organic Analysis, fifth edition, vol. 7, p. 2, Blakiston's Son & Co. Inc., Philadelphia).

The known methods for the production of plant alkaloids are based upon the fact that the alkaloids do occur in the form of salts of organic or inorganic acids. Such known processes involve the following general steps:

(A) Extracting the alkaloidal salts with a suitable solvent such as alcohol, water, etc.;
(B) Conversion of the alkaloidal salts in such solution with an alkalinizing agent such as lime, magnesia and sodium hydroxide;
(C) Extraction of the alkaloidal bases with a solvent.

Modifications of these general steps may be practiced. Thus, Steps A and B may be reversed and these steps may involve numerous sub-steps such as the removal of resins, coloring matter, fats, etc. Further, certain exceptions in these general steps may be practiced such as the use of precipitants for soluble alkaloids not removed by immiscible solvents, and distillation for volatile alkaloids, such as nicotine (see Henry, "The Plant Alkaloids," second edition, p. 6, Churchill, London, 1924).

After it was discovered that alkaloids which exhibit the physiological action of curare could be produced from species of Erythrina, the known processes for the production of plant alkaloids were reviewed. In view of the complex and labile or sensitive nature of many of the Erythrina alkaloids, and the complex mixture in which they occur, it was necessary to devise carefully controlled and especially adapted processes for their production. Important modifications had to be made in the known processes.

When seeds or parts of plants of the species of Erythrina are extracted with water, alcohol, etc. (after first having removed the fats), a crude extract is obtained which contains alkaloids which have a high paralysis potency. When this extract is made slightly alkaline and is extracted with a solvent immiscible in water such as chloroform, a crude active alkaloidal fraction is obtained which has a curare-like action. This is called the "free" alkaloidal fraction. From this fraction, a number of individual alkaloids have been isolated and identified suchas $\alpha$- and $\beta$-erythroidine, erythraline, erythramine and erythratine.

After the "free" alkaloidal fraction had been obtained, it was then found, surprisingly, that the Erythrina seeds contained not only the "free" alkaloidal fraction, but also other new alkaloids which have been called the "combined" alkaloids because they have been found to be combined with an acid through an ester linkage. These new combined alkaloids appear to be esters of sulfoacetic acid, $HO_3SCH_2CO_2H$, and new alkaloidal molecules. This is evidenced by the fact that acid or alkaline hydrolysis of the new "combined" alkaloids yields two fragments in each case, the sulfoacetic acid, and the alkaloidal portion which has been called the "liberated" alkaloid. To the applicant's knowledge such "combined" alkaloids are without parallel in alkaloid chemistry. These new alkaloidal esters of sulfoacetic acid exhibit the physiological action of curare, and likewise, the valuable property of forming soluble sodium salts which renders them suitable for injection.

The presence of the "combined" alkaloids in the seeds of Erythrina was entirely unexpected and was discovered in connection with physiological tests with solutions of extracts obtained from the seeds. Thus, when seeds of Erythrina berteroana Urb. (Benitez 9159) were extracted with petroleum ether to remove fats, and then with alcohol and the alcohol extractives dissolved in a definite volume of water, the aqueous solution was found to be active at the threshold dose of 0.5 ml./kg. frog for curare-like action, when injected intralymphatically. When the solution was weakly alkalinized with sodium bicarbonate, exhaustively extracted with chloroform to remove the "free" alkaloidal fraction, neutralized, chloroform removed, and retested on frogs, it was found to be still active at 0.5 ml./kg. The "free" alkaloidal fraction was dissolved in water at the concentration of the original solution and found to be active at 2.0 ml./kg. Therefore, the original threshold dose was not a measure of the activity of the "free" alkaloidal fraction, but rather that of a second very water-soluble fraction which was more active. The solution exhausted of the "free" fraction was acidified with hydrochloric acid and refluxed. After cooling, treating with sodium bicarbonate and extracting with chloroform, a new fraction of hydrolyzed or "liberated" alkaloid bases was obtained. The residual aqueous solution, properly adjusted as to pH was now one-tenth as active in frogs and the new "liberated" fraction showed activity upon testing.

This application is more particularly concerned with the selective production of the "free" fraction from various species of Erythrina. According to my invention, the "free" fraction may be selectively produced from the plant species by several processes. One process according to my invention involves the intermediate separation of the known alkaloid hypaphorine which is physiologically inert.

The production of the "free" fraction may involve the following general steps briefly described, particularly as applied to the seeds:

(1) Extraction of the seeds to remove fats.
(2) Extraction of the total "free" and "combined" alkaloids with a solvent such as methyl or ethyl alcohol.
(3) Distillation of the alcohol solution to dryness and dissolving of the residue in water.
(4) Clarification of the aqueous solution by weakly acidifying and extracting with petroleum ether and then with chloroform to remove traces of fats. This operation must be carried out carefully.
(5) Alkalinization of the clarified aqueous solutions with a weak alkalinizing agent.
(6) Extraction of the weakly or slightly alkalinized aqueous solution with chloroform which removes the "free" alkaloidal fraction and thus separates the "free" and "combined" alkaloidal fractions.

Certain variations may be practiced in carrying out this general process. Thus, for example:

(a) Step 1 may be omitted and the fats taken out at Step 4 in the process.
(b) The extraction at Step 2 may be carried out with water in which case Step 3 may be omitted.
(c) The alkaloid, hypaphorine, occurs in species of Erythrina and can be removed by acidifying the extract remaining after Step 4, concentrating to a small volume and refrigerating whereupon the hypaphorine salt crystallizes out. Since the "combined" alkaloids may be hydrolyzed to "liberated" alkaloids by acid treatment, in the process involving the intermediate production of hypaphorine hydrochloride treatment of the extract with hydrochloric acid must be carried out very quickly in order to ensure selective production of the "free" fraction free from any hydrolyzed "combined" fraction.

Among the species which I have found to contain an alkaloidal "free" fraction having a physiological action similar to curare, may be mentioned the following:

E. herbacae L.
E. flabelliformis Kearney
E. variegata (L.) var. orientalis (L.) Merrill
E. variegata (L.) var. picta
E. berteroana Urb.
E. velutina Willd.
E. crista-galli L.
E. sandwicensis Deg.
E. fusca Lour.
E. poeppigiana O. F. Cook
E. subumbrans Hassk. (Merrill)
Species No. 9146, 9149
E. hondurensis Standley
E. goldmanii
E. umbrosa
E. aurantiaca
E. breviflora
E. costaricensis
E. cubensis
E. lanata
E. panamemsia
E. caffra
E. corallodendron
E. mulungu
E. senegalensis
E. suberosa
E. insularis
E. glauca Willd.
E. abysinnica Lam.
E. arborescens Roxb.
E. glabrescens
E. stricta
E. falcata The physiologically active alkaloidal "free" fraction is found in various parts of plants of the species mentioned, such as the bark of stems or roots, seeds, flowers, etc. I have found that the alkaloidal "free" fractions obtained from all of the species exhibit similar physiological action. However, the physical and chemical properties of the alkaloidal "free" fractions differ somewhat in that some of them are light-sensitive, unstable, of different solubility, etc., and for this reason I have developed special methods of treatment for the final product which may be suitably modified or adapted to the particular case for the production of various individual "free" alkaloids.

Methods by which the "free" alkaloidal fraction substantially free from either the "combined" or "liberated" fractions may be selectively produced from seeds of various species of Erythrina are illustrated by the specially developed processes described in the following examples. It will be understood that the processes disclosed in the examples may be modified in various respects without departing from the spirit and scope of the invention.

*Example I*

About 600 g. of ground bark of *E. velutina* Willd. (40 mesh) are exhaustively extracted for about 18 hours with methyl alcohol. The cold extract is filtered from precipitated resinous matter, and concentrated in vacuo to about 200 ml. About 2 ml. of concentrated hydrochloric acid are added, and the solution poured into 250 ml. of water. The mixture is allowed to stand in the refrigerator until the precipitated resins, etc., are completely solidified. The resins are removed by filtration, and the filtrate is concentrated in vacuo until all residual alcohol is removed. The concentrate is made slightly alkaline by treatment with sodium bicarbonate, and exhaustively extracted with chloroform. It is distilled in vacuo (nitrogen capillary) at 30° to leave the crude alkaloidal fraction.

Example II

About 98.5 g. of powdered seeds of *E. herbacea* L. are extracted for about three hours with petroleum ether in a continuous apparatus. The solvent is distilled finally in vacuo, and a residue of about 20.4 g. of fatty oil remains. Traces of alkaloid material removed may be recovered by redissolving the oil in a solvent, and shaking with dilute acid to separate the alkaloidal material, etc. The seed powder is next extracted with ethyl alcohol. The solvent is distilled in vacuo at 30°, and the residue is dissolved in about 110 ml. of water and acidified with 2 ml. of concentrated hydrochloric acid. The solution is freed of residual fatty oil droplets, etc., by repeated mild extraction with chloroform. The clarified aqueous solution is then concentrated in vacuo to low volume, and hypaphorine hydrochloride crystallized. The treatment with hydrochloric acid is carried out as rapidly as possible. The filtrate is diluted, and made slightly alkaline with sodium bicarbonate, and exhaustively extracted with chloroform. The solvent is removed in vacuo (nitrogen capillary) and the crude "free" alkaloidal fraction remains. It exhibits the physiological action of curare.

Example III

About 74 g. of powdered seeds of *E. flabelliformis* Kearney are processed in a manner similar to the method described for *E. herbacea* L. in Example II. The residue obtained by removal of the solvent from the ethyl alcohol extraction is dissolved in water, acidified with concentrated hydrochloric acid, etc. Hypaphorine hydrochloride crystallizes. From the residue of the hypaphorine hydrochloride extraction, the crude physiologically active "free" alkaloid fraction is obtained.

Example IV

About 100 g. of powdered seeds of *E. variegata* L. var. orientalis (L.) Merrill are treated according to the process described for *E. herbacea* L. in Example II.

Example V

Powdered seeds of *E. berteroana* Urb. are treated according to the process described for *E. herbacea* L. in Example II.

Example VI

About 100 g. of powdered seeds of *E. cristagalli* L. are treated according to the process described for *E. herbacea* L. in Example II.

Example VII

Powdered seeds of *E. sandwicensis* Deg. are treated according to the process described for *E. herbacea* L. in Example II.

Example VIII

Powdered seeds of *E. fusca* Lour. are treated according to the process described for *E. herbacea* L. in Example II.

Example IX

Powdered seeds of *E. variegata* (L.) var. picta are treated according to the process described for *E. herbacea* L. in Example II.

Example X

Powdered seeds of *E. subumbrans* (Hassk) Merrill are treated according to the process described for *E. herbacea* L. in Example II.

Example XI

Powdered seeds of *E. species* No. *9146* or *9149* are treated according to the process described for *E. herbacea* L. in Example II.

Example XII

About 100 g. of seed powder are treated on the steam bath with 300 ml. of water. The mixture is filtered and the treatment repeated until all of the alkaloidal material is removed. The combined filtrates are concentrated, made slightly alkaline with a sodium bicarbonate solution, and the active "free" alkaloidal fraction extracted exhaustively with chloroform. The hypaphorine remains in the aqueous layer, and may be recovered.

Example XIII

About 100 g. of seed powder are treated on the steam bath with 300 ml. of weakly acidified water. The mixture is filtered and the treatment repeated until all of the alkaloidal material is removed. The combined filtrates are concentrated, made slightly alkaline with sodium bicarbonate solution, and the active "free" alkaloidal fraction extracted exhaustively with carbon tetrachloride. The hypaphorine remains in the aqueous layer and may be recovered.

Example XIV

About 100 g. of seed powder are mixed on the steam bath with 50% water-alcohol combination. The mixture is filtered, and the treatment is repeated until all of the alkaloidal material is removed. The combined filtrates are concentrated, made slightly alkaline with sodium bicarbonate solution, and the active "free" alkaloidal fraction extracted exhaustively with benzene. The hypaphorine remains in the aqueous layer, and may be recovered.

This application is a continuation-in-part of my application Serial No. 180,143, filed December 16, 1937.

I claim:

1. A product having the physiological activity of curare and consisting of the total chloroform-soluble "free" alkaloidal fraction obtained from species of Erythrina, and which is free from the "combined" alkaloids obtainable from such species in the form of esters of sulfoacetic acid and "liberated" alkaloids, and free from the "liberated" alkaloids obtainable by hydrolysis of the said "combined" alkaloids.

2. A process for the production of the physiologically active alkaloidal "free" fraction from species of Erythrina comprising removing any fats present in seeds of said species, extracting the pre-treated seed material with alcohol, concentrating the extract, adding water to the concentrate, weakly acidulating the aqueous mixture with hydrochloric acid, quickly clarifying the acidulated aqueous extract and concentrating the clarified aqueous solution in vacuo at reduced temperature to low volume to crystallize hypaphorine hydrochloride, removing the crystallized hypaphorine hydrochloride, diluting the filtrate, weakly alkalinizing the filtrate, and exhaustively extracting with an organic water immiscible solvent to obtain the physiologically active "free" alkaloidal fraction substantially free from the "combined" or "liberated" fractions obtainable from such species.

3. A process for the production of the physiologically active alkaloidal "free" fraction from species of Erythrina comprising removing any fats present in seeds of said species, extracting the pre-treated seed material with alcohol, concentrating the extract, adding water to the concentrate, weakly acidulating the aqueous mixture with hydrochloric acid, quickly clarifying the acidulated aqueous extract with chloroform and concentrating the clarified aqueous solution in vacuo at reduced temperature to low volume to crystallize hypaphorine hydrochloride, removing the crystallized hypaphorine hydrochloride, diluting the filtrate, alkalinizing the filtrate with sodium bicarbonate, and exhaustively extracting with an organic water immiscible solvent to obtain the physiologically active "free" alkaloidal fraction, substantially free from the "combined" or "liberated" fractions obtainable from such species.

4. A process for the production of the physiologically active alkaloidal "free" fraction from seeds of E. berteroana Urb. comprising removing any fats present in said seeds, extracting the pre-treated seed material with alcohol, concentrating the extract, adding water to the concentrate, weakly acidulating the aqueous mixture with hydrochloric acid, quickly clarifying the acidulated aqueous extract with chloroform, and concentrating the clarified aqueous solution in vacuo at reduced temperature to low volume to crystallize hypaphorine hydrochloride, removing the crystallized hypaphorine hydrochloride, diluting the filtrate, weakly alkalinizing the filtrate, and exhaustively extracting with chloroform to obtain the physiologically active alkaloidal "free" fraction, substantially free from the "combined" and "liberated" fractions obtainable from such species.

5. A process for the production of the physiologically active alkaloidal "free" fraction from seeds of E. poeppigiana O. F. Cook comprising removing any fats present in said seeds, extracting the pre-treated seed material with alcohol, concentrating the extract, adding water to the concentrate, weakly acidulating the aqueous mixture with hydrochloric acid, quickly clarifying the acidulated aqueous extract with chloroform, and concentrating the clarified aqueous solution in vacuo at reduced temperature to low volume to crystallize hypaphorine hydrochloride, removing the crystallized hypaphorine hydrochloride, diluting the filtrate, weakly alkalinizing the filtrate, and exhaustively extracting with chloroform to obtain the physiologically active alkaloidal "free" fraction, substantially free from the "combined" and "liberated" fractions obtainable from such species.

6. A process for the production of the physiologically active alkaloidal "free" fraction from seeds of E. glauca Willd. comprising removing any fats present in said seeds, extracting the pre-treated seed material with alcohol, concentrating the extract, adding water to the concentrate, weakly acidulating the aqueous mixture with hydrochloric acid, quickly clarifying the acidulated aqueous extract with chloroform, and concentrating the clarified aqueous solution in vacuo at reduced temperature to low volume to crystallize hypaphorine hydrochloride, removing the crystallized hypaphorine hydrochloride, diluting the filtrate, weakly alkalinizing the filtrate, and exhaustively extracting with chloroform to obtain the physiologically active alkaloidal "free" fraction, substantially free from the "combined" and "liberated" fractions obtainable from such species.

KARL FOLKERS.